United States Patent
Gibson et al.

(10) Patent No.: US 7,139,278 B2
(45) Date of Patent: Nov. 21, 2006

(54) ROUTING TRAFFIC IN A COMMUNICATIONS NETWORK

(75) Inventors: Mark Gibson, Brighton (GB); Roy Mauger, Radlett (GB); Dave Stacey, Stansted Abbotts (GB)

(73) Assignee: Nortel Networks Limited, St. Laurent (CA)

( * ) Notice: Subject to any disclaimer, the term of this patent is extended or adjusted under 35 U.S.C. 154(b) by 931 days.

(21) Appl. No.: 10/032,411

(22) Filed: Dec. 21, 2001

(65) Prior Publication Data

US 2003/0118036 A1 Jun. 26, 2003

(51) Int. Cl.
*H04L 12/28* (2006.01)
*H04L 12/56* (2006.01)

(52) U.S. Cl. .................. 370/401; 370/392

(58) Field of Classification Search ............. 370/392, 370/389, 409; 709/238
See application file for complete search history.

(56) References Cited

U.S. PATENT DOCUMENTS

| | | | |
|---|---|---|---|
| 6,463,061 B1 * | 10/2002 | Rekhter et al. ............. | 370/392 |
| 6,731,639 B1 * | 5/2004 | Ors et al. ............. | 370/395.51 |
| 6,870,841 B1 * | 3/2005 | Brown et al. ............. | 370/389 |
| 2002/0141343 A1 * | 10/2002 | Bays ............. | 370/235 |
| 2004/0202171 A1 * | 10/2004 | Hama ............. | 370/395.1 |
| 2005/0100027 A1 * | 5/2005 | Lienwand et al. ............. | 370/400 |

* cited by examiner

*Primary Examiner*—Brian Nguyen
(74) *Attorney, Agent, or Firm*—Barnes & Thornburg LLP

(57) ABSTRACT

In a packet communications network system, a border gateway protocol is employed to route an information packet from a source in a first autonomous system via a first label switched path to a destination in a second autonomous system via first and second border routers at an interface between the first and second autonomous systems. A label stack attached to the packet identifies both a forwarding interface for the packet and a forwarding behaviour at that interface. This provides a mapping from the first label switched path on to a second label switched path to the destination in the second autonomous system. Preferably, the destination router in the second autonomous system returns to the source router in the first autonomous system a two-label stack identifying first and second paths across the first and second autonomous systems respectively.

11 Claims, 5 Drawing Sheets

US 7,139,278 B2

ROUTING TRAFFIC IN A COMMUNICATIONS NETWORK

FIELD OF THE INVENTION

This invention relates to apparatus and methods for the routing of packet traffic in a communications network arrangement comprising a plurality of autonomous systems.

BACKGROUND OF THE INVENTION

Communication networks are being developed in which traffic is carried within packets each of which is routed to an appropriate destination on the basis of information carried in a header attached to that packet. Such networks comprise a number of nodes each of which has a routing table to which reference is made to determine the processing of incoming packets. These networks include asynchronous transfer mode (ATM) and Internet Protocol (IP) networks.

A development of this packet transport technique provides communication across two or more effectively independent networks, generally referred to as an autonomous system, each with its own set of nodes and routing tables. In such an arrangement, autonomous system border routers (ASBR) are provided at the boundary of each autonomous system so as to provide communication paths between these systems or networks. The border routers also provide a means of passing information between the customers or networks so that the packets from one network can be correctly routed to destinations in another.

In such an arrangement, routing information is passed between the border routers using a protocol that is generally referenced to as a border gateway protocol (BGP). This protocol permits the border routers to exchange routing information concerning destinations that can be reached from these routers. The border routers may be referred to as BGP peers as they share a peering relationship across a BGP connection.

A typical arrangement of this type is shown in FIG. 1 of the accompanying drawings which is introduced for explanatory and comparative purposes. This arrangement comprises two networks or autonomous systems 11a, 11b having respective edge routers A, D providing a communications path therebetween. Router A in autonomous system 11a is a BGP (border gateway protocol) peer with router D and has route information to access nodes B and C in system 11a. Similarly, router D is a BGP peer with router A and has route information to access nodes E and F in system 11b. Thus, router A advertises itself to D as the next hop router on the route to B and C. Similarly, router D advertises itself to A as the next hop router on the router to E and F. This use of border gateway protocol (BGP) is often referred to as exterior BGP (EBGP), as route information is disseminated to a router that is exterior to the system to which that route information relates.

Within the network 11a, router A disseminates its route information, received from its BGP peer D, to routers B and C, again using BGP (border gateway protocol). The analogous process is performed by router D in network 11b. This is generally referred to as interior BGP (IBGP).

A recent development in network technology has been the introduction of multiprotocol label switched (MPLS) networks. In such networks, a label distribution protocol (LDP) provides a route distribution mechanism for routing packets across an autonomous system. If a packet is destined for another autonomous system, the LDP (label distribution protocol) sets up a label mapping for a route to the correct next hop border router. The packet must then be re-labelled according to the protocol of the new autonomous system using the destination IP address in its IP header.

The above process requires examination of the packet IP header at the boundary of the two autonomous systems or networks. This adds to the complexity of the system and negates some of the benefits that have been provided by the introduction of MPLS. One approach to this problem is the use of an explicit routing mechanism to define a label switched path (LSP). Using this mechanism, it is possible to pre-establish labels for an end-to-end label switched path from a specified source to a specified destination such that no reprocessing of the IP header is necessary. This however, leads to statically provisioned paths between autonomous systems and does not address the problem of determining dynamic established paths e.g. to enable load balancing and to facilitate traffic engineering.

OBJECT OF THE INVENTION

An object of the invention is to minimize or to overcome the above disadvantage.

A further object of the invention is to persuade an improved method of path establishment in a packet communications system comprising a plurality of interconnected autonomous systems.

SUMMARY OF THE INVENTION

According to a first aspect of the invention there is provided a method of routing an information packet from a source in a first autonomous system via a first label switched path to a destination in a second autonomous system via a second label switched path, the method comprising;
at an interface between the autonomous systems, mapping the first label switched path on to the second label switched path.

According to another aspect of the invention there is provided a method of routing an information packet from a source in a first autonomous system via a first label switched path to a destination in a second autonomous system via first and second border routers at an interface between said first and second autonomous systems, wherein border gateway protocol (BGP) is employed in which a BGP label identifies both a forwarding interface for a packet and a forwarding behaviour at that interface so as to provide a mapping from said first label switched path on to a second label switched path to the destination in said second autonomous system.

Advantageously the MPLS label identifies a next hop label switched path so as to identify an exterior interface mapping.

In our system and method, the border gateway protocol is extended to enable the dissemination of MPLS labels to perform source routing across multiple autonomous systems.

The method enables the establishment of label switched paths (LSP) within existing paths or tunnels in adjacent autonomous systems the interconnection of which can be managed in a dynamic manner without resource to examination of the IP header. MPLS labels may be used to enable multiple route storage in autonomous system border routers. In a further embodiment, a label is modified to change an egress label switched path of a border router so as to provide a cross-connect function. This may be used for traffic engineering and load balancing.

In a preferred embodiment, a border gateway protocol is employed to route an information packet from a source in a first autonomous system via a first label switched path to a destination in a second autonomous system via first and second border routers at an interface between the first and second autonomous systems. A label stack attached to the packet identifies both a forwarding interface for the packet and a forwarding behaviour at that interface. This provides a mapping from the first label switched path on to a second label switched path to the destination in the second autonomous system. The destination router in the second autonomous system returns to the source router in the first autonomous system a two-label stack identifying first and second paths across the first and second autonomous systems respectively.

The method may be embodied in software in machine readable form on a storage medium.

According to another aspect of the invention there is provided a communications network comprised by a plurality of interconnected autonomous systems and in which information packets are routed from a source in a first autonomous system via a first label switched path to a destination in a second autonomous system via first and second border routers at an interface between said first and second autonomous systems, wherein the communications network employs a border gateway protocol (BGP) in which a label identifies both a forwarding interface for a packet and a forwarding behaviour at that interface so as to provide a mapping from said first label switched path on to a second label switched path to the destination in said second autonomous system.

BRIEF DESCRIPTION OF THE DRAWINGS

An embodiment of the invention will now be described with reference to the accompanying drawings in which.

DESCRIPTION OF PREFERRED EMBODIMENT

Figure 1:
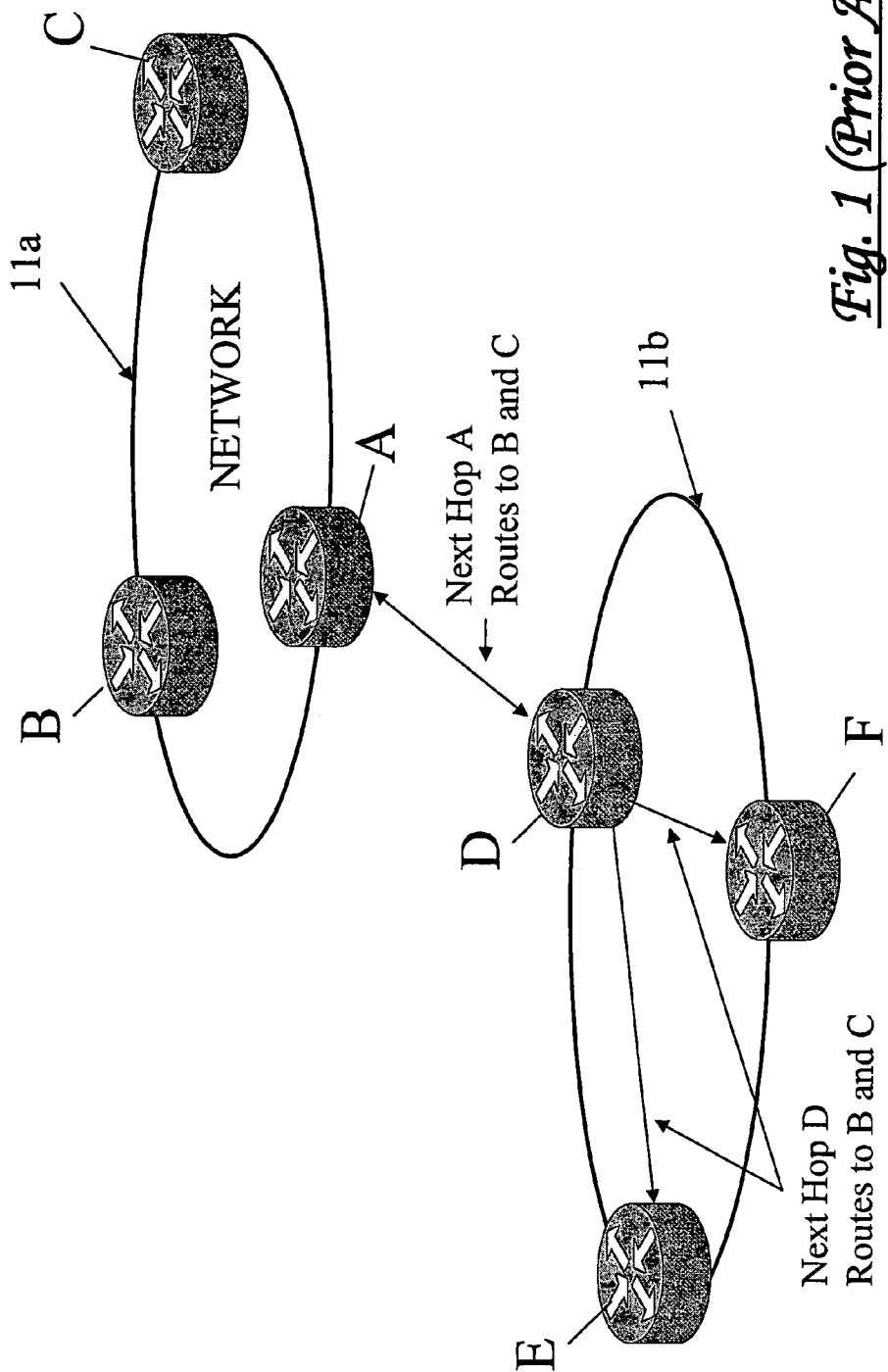
FIG. 1, which has been discussed above, shows in schematic form a conventional network arrangement.
Figure 2:
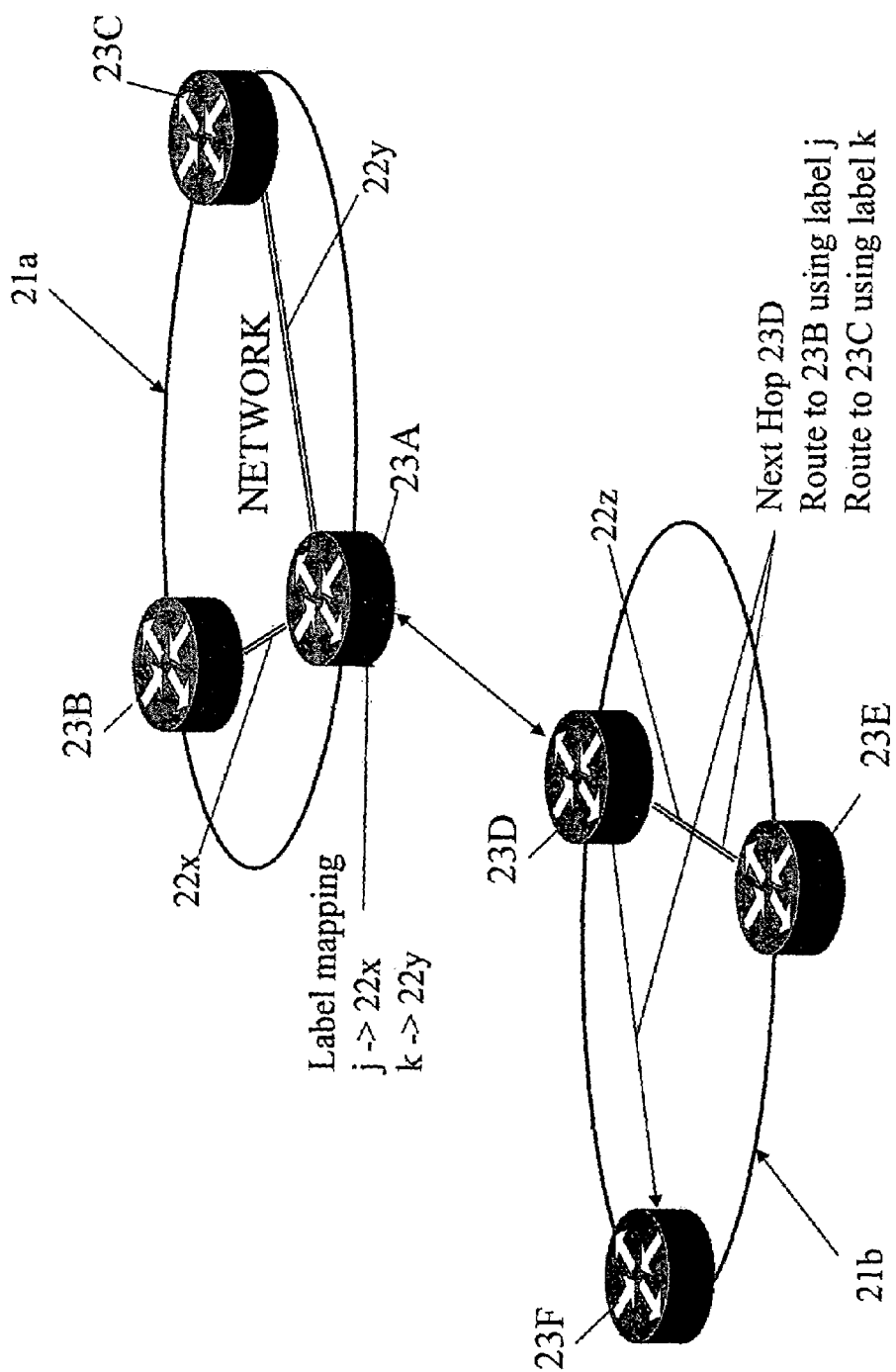
FIG. 2 shows a network according to a preferred embodiment of the invention.

Referring now to FIG. 2, this shows a network arrangement comprising first (21a) and second (21b) autonomous systems within each of which label switched paths 22x, 22y, 22z are-established for the routing of packets within that autonomous system. It will be appreciated that for simplicity, and for the purpose of explanation, only two linked autonomous systems are shown and only a small number of routers 23A to 23C and 23D to 23F are shown in each respective autonomous system.

In the network arrangement of FIG. 2, a border gateway protocol (BGP) is employed in which a BGP label identifies both a forwarding interface for a packet and a forwarding behaviour at that interface so as to provide a mapping on to an appropriate label switched path.

BGP, as noted above, is used to notify one autonomous system of the available routes to destinations on an adjacent autonomous system. This route information is encoded in a network layer reachability information (NLRI) element that is inserted in the BGP message. FIG. 2 illustrates schematically the manner in which a label is used to identify an LSP (label switched path) in an adjacent autonomous system. In FIG. 2, border router 23A has a first LSP (label switched path) 22x to edge router 23B and another LSP 22y to edge router 23C. Border router A advertises these reachable routers 23B and 23C to 23D in a BGP message, and identifies the routes to each router using new labels—in this case label "j" that maps on to label switched path 22x and therefore identifies the route to router 23B, and label "k" that maps on to label switched path 23y and therefore identifies the route to router 23C.

Border router 23D then advertises these new routes into its autonomous system 21b and updates routers 23E and 23F. This message still states border router 23D as the next hop in the route to routers 23B and 23C, but the message now includes the label information that uniquely identifies the onward routes at 23A. It therefore advertises label j as the label that identifies the route to router 23B and label k as the label that identifies the route to router 23C.

If router 23E now receives a packet for despatch to router 23B, it looks at its route information and determines that border router 23D is the next hop for the route to 23B and that label j identifies the route from router 23D to router 23B. Router 23B also knows that it has a label switched path 22z from itself to router 23D. Router 23B thus forms a two-label stack, the top label being the label that identifies the label switched path 22z and the lower label j that identifies the route to router 23B.

In this manner, the BGP returned label can be used to achieve source routing of a packet from a particular autonomous system border router to another autonomous system border router.

Figure 3:
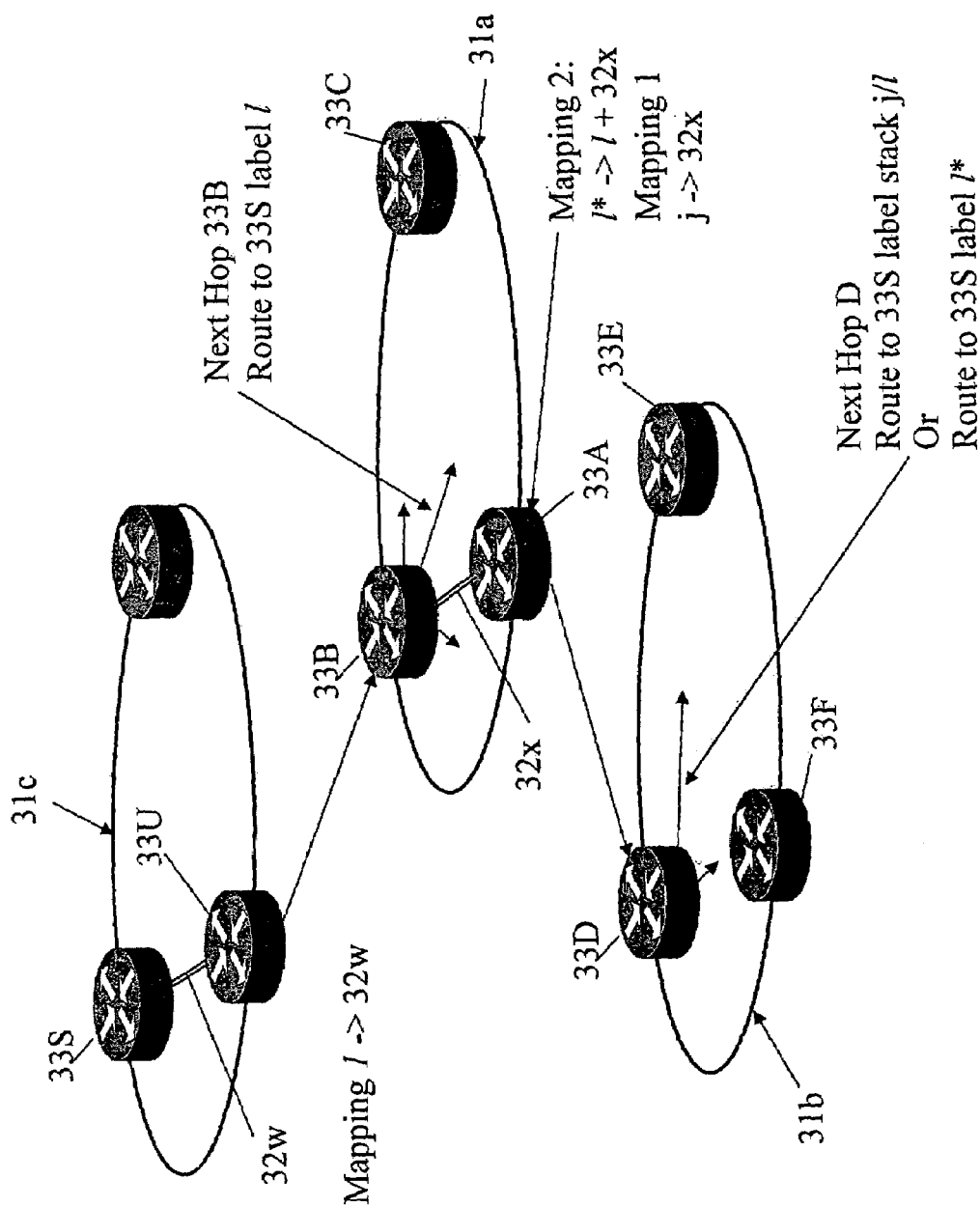
FIGS. 3 and 4 illustrates methods of route dissemination in the network of FIG. 2.

This scheme can be extended to cross multiple autonomous systems as shown schematically in FIG. 3. Using BGP (border gateway protocol) in the above manner, routes to a particular destination can be advertised across multiple domains providing the autonomous system border router that re-advertises the route also places itself as the next hop for that route.

In the communications system of FIG. 3, the route to autonomous system border router 33S on autonomous system 31c is propagated back to the IBGP peers on autonomous system 31a. EBGP (exterior border gateway protocol) advertises the route to router 33S, and border router 33B on autonomous system 31a advertises this route to its IBGP peers using label "l" to identify the route. The corresponding mapping at border router 33U in autonomous system 31c is also established.

This route is now advertised by border router 33A to autonomous system border router 33D on autonomous system 31b over EBGP, then by router 33D to its IBGP peers. There are now two options for advertising the label information that corresponds to this label switched path. In the first case, a new label j is mapped at router 33A on to label switched path 32x that connects router 33A to the next hop router 33B for the route to router 33S. Border router 33D thus advertises a label stack j/l (where j is the top label) to its IBGP peers. Thus any packet from routers 33E or 33F is labelled with the correct label for a label switched path from router 33E or 33F to router 33D, then label j is used to forward the packet across autonomous system 31a and label l is used to forward the packet across autonomous system 31c.

In the alternative method, a single label l* is advertised in border router 33S. At border router 33A, this label l* corresponds to a double process, namely: push label l on to the label stack and then the label that corresponds to label switched path 32x. In this way, packets still arrive at the egress of label switched path 32x with the label l that identifies the route to border router 33S.

Multiple Stored Routes

Under normal operation, border gateway protocol permits an autonomous system border router to store a single active route to a given destination. This is chosen by applying local routing policy plus advertised weighting information to the set of possible advertised routes. The possible set of advertised routes are stored in the Adj_RIB_ln (i.e. the incoming advertised route Information Base) and the active routes are added to the Loc_RIB (i.e. the local Route Information Base).

These routes are identified by each having a unique NLRI (network layer reachability information) element. In a further embodiment, provision is made for multiple routes within the BGP scheme described above. As the MPLS label information is included in the NLRI of a BGP message, two routes to the same destination can be stored concurrently providing those routes have different labels.

Figure 4:
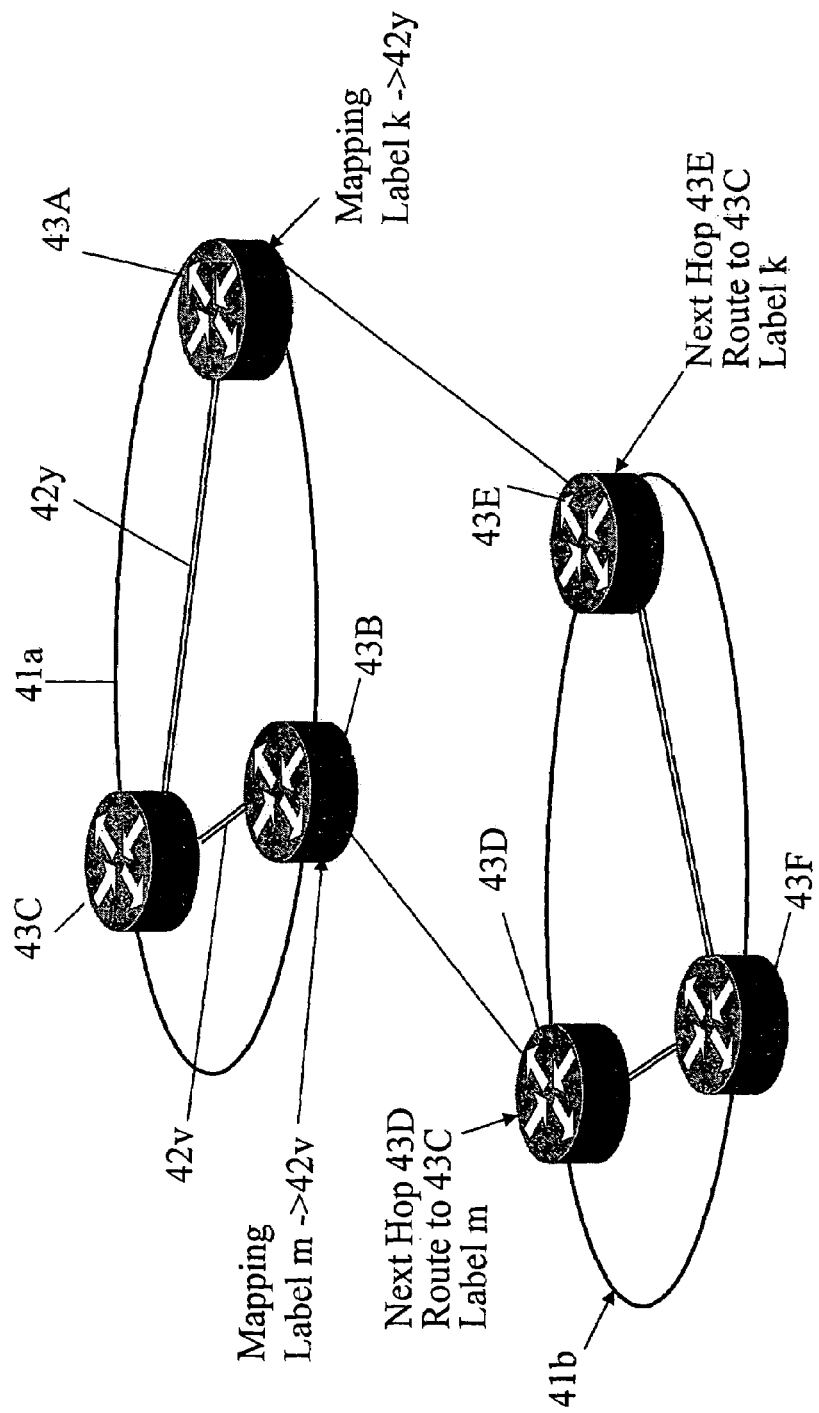

This situation is illustrated schematically in FIG. 4. In the communications arrangement shown in FIG. 4, border router 43B on autonomous system 41a is a BGP peer with border router 43D on autonomous system 41b. Also, border router 43A on autonomous system 41a is a BGP peer with border router 43E on autonomous system 41b. Both routers 43A and 43B have a route to router 43C and this information is advertised into autonomous system 41b via the border gateway protocol. Border router 43D advertises itself as the next hop in the route to router 43C, and identifies that route with label m. Border router 43E advertises itself also as the next hop to router 43C using a different label, k. Router 43F in autonomous system 41b therefore has two possible paths to router 43C in system 41a, one route via border router 43D and the other route via border router 43E, both routes being distinguishable from each other by virtue of their having different labels.

The choice of which of the two paths to use to reach router 43C is left to router 43F, though dynamic policy decision based on the usage of either the local LSP connections is has to autonomous system border routers 43D and 43E on autonomous system 41b, or remote feedback of path availability (represented by labels k and m) on autonomous system 41b can be used. The choice of paths also enables path protection of high priority traffic, e.g. in the event of failure of one of the border routers.

Cross Connect Label Re-mapping

In a further enhancement of the technique described above, the labels mapped at the autonomous system border routers to identify a route can be used in the same manner as a switch cross-connect function. Namely, the mapping of the label can be altered to change the egress label switched path (LSP) of an autonomous system border router. This is analogous to changing the cross-connection of incoming and outgoing voice circuits in a telephony switch. When used in this manner, these labels are referred to as cross-connect labels (Xc-Labels).

Figure 5:
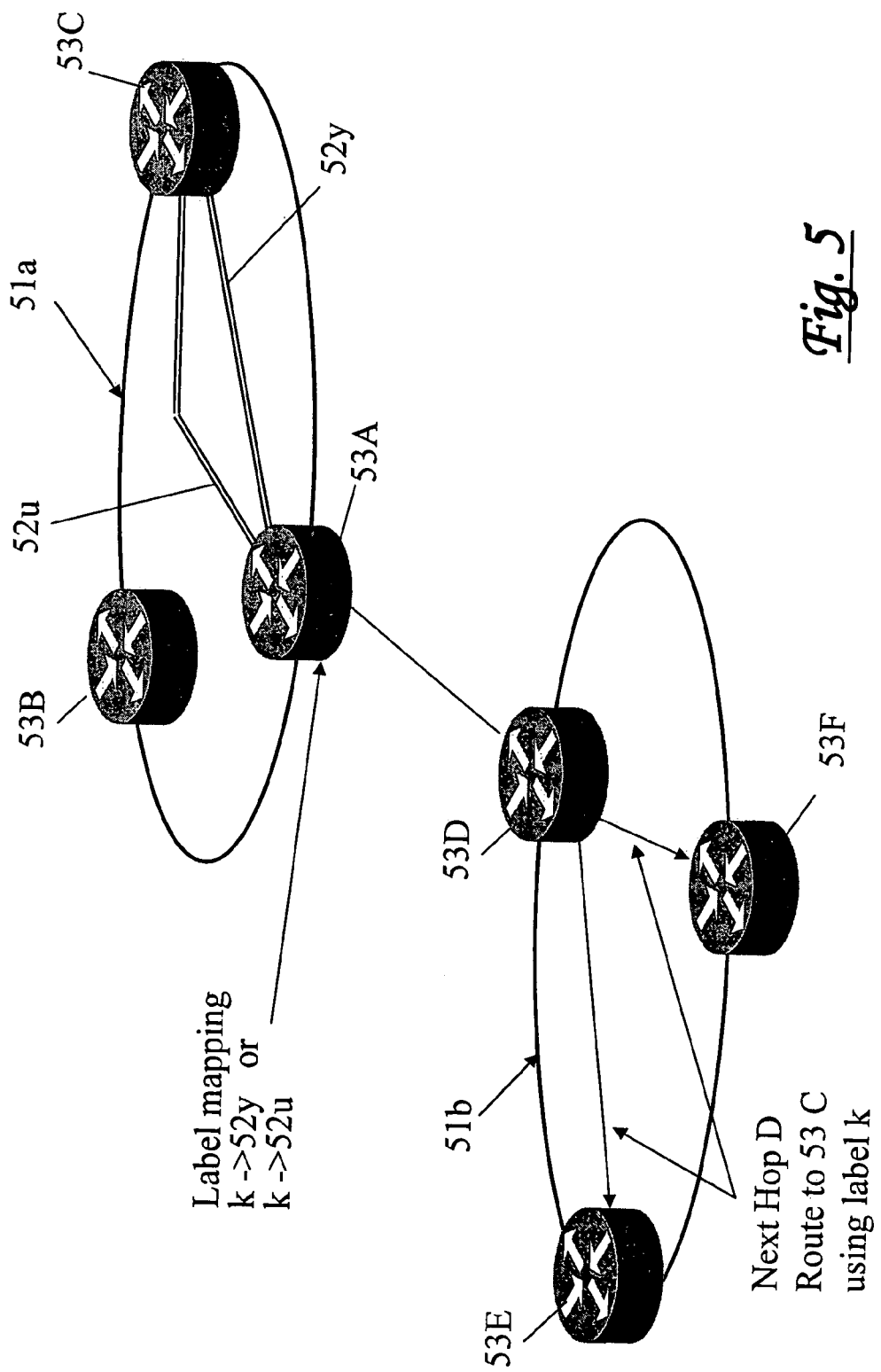
FIG. 5 illustrates cross-connect label distribution in the network of FIG. 2.

This operation is illustrated schematically in FIG. 5. In FIG. 5, autonomous system border router 53D advertises the label k, as the route to ASBR 53C, to its IBGP peers on autonomous system 51b. At router 53A there are two possible label switched paths 52y and 52u to router 53C. Border router 53A can therefore choose which of these label switched paths it uses to service packets that arrive with label k. Border router 53A can also change the label switched path on to which it maps these packets without re-advertising the route in BGP (border gateway protocol), providing the service characteristics of the connection remain unaltered.

In a further extension this technique, border router 53A may for example have as many as ten such label switched paths available that provide a route from router 53A to router 53C, autonomous system border router 53D can then advertise up to ten distinct labels as separate routes to router 53C, and at border router 53A each of these labels can map on to a single one of the label switched paths that connect router 53A to router 53C. This type of operation would enable, for example, each of ten different differentiated service (Diffserv) packet forwarding behaviours to be separately advertised.

However, any ratio of advertised labels to forwarding LSPs could be used. In a different configuration, if for example, ten cross-connect labels (Xc-labels) are advertised and mapped on to two forwarding label switched paths, a very fine-grained load balancing mechanism is achieved for the routes from router 53A to router 53C.

It will be understood that the above description of preferred embodiments is given by way of example only and that various modifications may be made by those skilled in the art without departing from the spirit and scope of the invention.

The invention claimed is:

1. A method of routing an information packet from a source router in a first autonomous system to a destination router in a second autonomous system, the method comprising;

establishing a first label switched path within said first autonomous system from the source router to an edge router of said first autonomous system;

establishing a second label switched path within said second autonomous system from an edge router of said second autonomous system to said destination router;

at an interface between the first and second autonomous systems comprising said edge routers of said systems, mapping the first label switched path on to the second label switched path, wherein the destination router in the second autonomous system returns to the source router in the first autonomous system a two-label stack comprising a first label and a second label identifying said first and second label switched paths across the first and second autonomous systems respectively.

2. A method of routing an information packet from a source router in a first autonomous system to a destination router in a second autonomous system via respective first and second border routers comprising an interface between said first and second autonomous systems, the method comprising:

establishing a first label switched path within said first autonomous system from the source router to the first border router;

establishing a second label switched path within said second autonomous system from the second border router to said destination router; and employing a border gateway protocol (BGP) to communicate a label that identifies both a forwarding interface for a packet and a forwarding behaviour at the interface between said autonomous systems so as to provide a mapping from said first label switched path on to said second label switched path to the destination router in said second autonomous system, wherein the destination router in the second autonomous system returns to the source router in the first autonomous system a two-label stack comprising a first label and a second label identifying said first and second label switched paths across the first and second autonomous systems respectively.

3. A method as claimed in claim 2, wherein said first label identifies said first label switched path from the source router to the first border router in said first autonomous system, and said second label identifies a route from the source router to the destination router.

4. A method as claimed in claim 2, wherein each router advertises new routes to reachable routers in its respective autonomous system via a BGP message.

5. A method as claimed in claim 4, wherein route information is encoded in a network layer reachability information (NLRI) element that is inserted in the BGP message.

6. A method as claimed in claim 5, wherein one of said labels is modified to change an egress label switched path of said border router so as to provide a cross-connect function.

7. A method as claimed in claim 5, wherein said labels enable multiple diversion route storage at said border router.

8. A method as claimed in claim 7, and including selection of routes from said multiple diversion route storage so as to provide load balancing.

9. Software in computer readable form on a storage medium and arranged to perform a method as claimed in claim 2.

10. A communications network router controlled by software as claimed in claim 9.

11. A communications network comprised by a plurality of interconnected autonomous systems and in which information packets are routed from a source router in a first autonomous system via a first label switched path established within said first autonomous system from said source router to a first border router of said first autonomous system to a destination router in a second autonomous system via said first border router and a second border router of said second autonomous system, said border routers comprising an interface between said first and second autonomous systems, wherein the communications network is arranged to employ a border gateway protocol (BGP) to communicate a label which identifies both a forwarding interface for a packet and a forwarding behaviour at the interface between the autonomous systems so as to provide a mapping from said first label switched path on to a second label switched path established within the second autonomous system between the second border router and the destination router in said second autonomous system and wherein the destination router in the second autonomous system is arranged to return to the source router in the first autonomous system a two-label stack comprising a first label and a second label identifying said first and second label switched paths across the first and second autonomous systems respectively.

* * * * *